United States Patent
Li et al.

(10) Patent No.: US 8,433,948 B2
(45) Date of Patent: Apr. 30, 2013

(54) METHOD AND APPARATUS FOR REALIZING APPLICATION HIGH AVAILABILITY

(75) Inventors: Ying Li, Beijing (CN); Jie Qiu, Beijing (CN); Jie Yang, Beijing (CN); Xiao Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/462,039

(22) Filed: May 2, 2012

(65) Prior Publication Data
US 2012/0216070 A1 Aug. 23, 2012

Related U.S. Application Data

(63) Continuation of application No. 12/728,302, filed on Mar. 22, 2010, now Pat. No. 8,195,979.

(30) Foreign Application Priority Data

Mar. 23, 2009 (CN) .......................... 2009 1 0127589

(51) Int. Cl.
*G06F 11/00* (2006.01)
(52) U.S. Cl.
USPC ............. 714/6.3; 714/4.1; 714/4.11; 714/4.4; 714/15

(58) Field of Classification Search .................... 714/4.1, 714/4.11, 4.4, 6.3, 15
See application file for complete search history.

(56) References Cited

U.S. PATENT DOCUMENTS

| | | | |
|---|---|---|---|
| 6,854,069 B2 | 2/2005 | Kampe et al. | |
| 7,246,256 B2 | 7/2007 | De La Cruz et al. | |
| 7,383,463 B2 | 6/2008 | Hayden et al. | |
| 2002/0154646 A1 | 10/2002 | Dubois et al. | |
| 2005/0193229 A1 | 9/2005 | Garg et al. | |

*Primary Examiner* — Charles Ehne
(74) *Attorney, Agent, or Firm* — Cantor Colburn LLP; Vazken Alexanian

(57) ABSTRACT

A method, apparatus, and computer program product for realizing application high availability are provided. The application is installed on both a first node and a second node, the first node being used as an active node, and the second node being used as a passive node. The method includes: monitoring access operations to files by an application during its execution on the active node; replicating the monitored updates to the file by the application from the active node to a storage device accessible to the passive node if the application performs updates to a file during the access operations; sniffing the execution of the application on the active node; and switching the active node to the second node and initiating the application on the second node in response to sniffing a failure in the execution of the application on the active node.

20 Claims, 13 Drawing Sheets

METHOD AND APPARATUS FOR REALIZING APPLICATION HIGH AVAILABILITY

CROSS REFERENCE TO RELATED APPLICATION

This application is a continuation of U.S. application Ser. No. 12/728,302, filed Mar. 22, 2010, which claims priority under 35 U.S.C. 119 from Chinese Patent Application 200910127589.0, filed Mar. 23, 2009, the entire contents of which are incorporated herein by reference.

BACKGROUND OF THE INVENTION

1. Field of the Invention

The present invention relates to the computer field, particularly to application high availability, and more particularly to a method and apparatus for realizing application high availability.

2. Description of Related Art

Application high availability (HA) refers to the ability of an application to provide access to users continuously and uninterruptedly. It is critical for enterprises.

FIG. 1 schematically illustrates a current solution for realizing application high availability, wherein a same application is installed on a first server and a second server respectively, the first server used as an active server, the second server as a passive server. A file management mechanism for HA specific to the application is included in (or associated with) the application, which mechanism is for monitoring access operations on disk files during the execution of the application, and for replicating modifications of disk files by the application to the passive server or a shared storage between the current server and the passive server.

An HA manager is installed in a third server coupled with the first server and the second server for: monitoring the execution status of the application on the current server, for initiating the application on the passive server when the application fails, and for switching the IP address of the application onto the passive sever. The HA manager could also be directly installed in the first server and the second server. In such a solution, only the file management mechanism for HA specific to the application included in the application knows the file structure of the application and its access operations, and is able to perform replication of updated files, while the HA manager does not know the file structure of the application.

In the current technology, different applications have their own HA mechanisms, and there is no general HA mechanism. For example, the large database software DB2 may configure the data repository in a particular directory for HA, and the Websphere Application Server (WAS) may configure the transaction log in a particular directory for HA. As another example, IBM's Tivoli System Automation (TSA), Veritas Cluster is actually a script execution framework with policy support, and provides HA automation for specific applications. Such HA mechanisms, however, cannot be applied in general applications because different applications access different files during their execution, and have different file directory structures; and the files accessed by an application during its execution are usually distributed in multiple places within and outside the installation directory of the application.

For example, Apache has the different paths for configurations and data as follows: /etc/apache2—httpd configuration (unchangeable); /etc/sysconfig/apache2—containing configuration files; /usr/share/apache2—all data related to apache. Therefore, there is no general HA mechanism in the current technology which can replicate the files updated during the execution of different applications to a passive server.

Such a current solution requires application designers to have high designing skills and to make great effort to design the HA mechanism, and application developers to have high developing skills and make great effort to implement the HA mechanism, as well as application users to understand application specific implementations and make great effort to configure the applications correctly.

SUMMARY OF THE INVENTION

In accordance with one aspect of the present invention, in a computer implemented method for realizing application high availability, an application is installed on a first node and on a second node, the first node being an active node, the second node being a passive node. The method includes the steps of: monitoring access operations to files by the application during execution of the application on the active node, replicating monitored updates to a file when the application performs updates during the access operations such replication being from the active node to a storage device accessible to the passive node, sniffing execution of the application on the active node, and switching the active node to the second node, and initiating the application on the second node, in response to sniffing a failure in the execution of the application on the active node.

In accordance with another aspect of the present invention, in apparatus for realizing application high availability, the application is installed both on a first node and a second node, the first node being an active node, and the second node being a passive node. The apparatus includes: a monitoring module for monitoring access operations to files by the application during its execution on the active node, a replicating module for replicating the monitored updates to the file by the application from the active node to a storage device accessible to the passive node, if the application performs updates to a file during the access operations, a sniffing module for sniffing the execution of the application on the active node, and a switching module for switching the active node to the second node, and initiating the application on the second node in response to sniffing a failure in the execution of the application on the active node.

The present invention relieves application designers and developers of the burden of HA designing and developing, and also relieves the burden of configuration for HA in application deployment.

BRIEF DESCRIPTION OF THE DRAWINGS

The present invention itself, however, as well as a preferred mode of use, further objects and advantages thereof, will best be understood by reference to the following detailed description of an illustrative embodiment when read in conjunction with the accompanying drawings, wherein.

DETAILED DESCRIPTION OF THE PREFERRED EMBODIMENTS

Embodiments of the present invention are described below with reference to the drawings. While numerous details are set forth in the following description for the present invention to be understood more thoroughly, those skilled in the art will understand that the present invention can be implemented without some of the specific details. In addition, it should be understood that the present invention is not limited to the described specific embodiments. Rather, it is contemplated that the present invention can be implemented using any combination of the following features and elements, regardless of whether they involve different embodiments. Therefore, the following aspects, features, embodiments and advantages are only for the purpose of illustration, and cannot be construed as elements or limitations of the attached claims, unless otherwise set forth therein explicitly.

Figure 1:
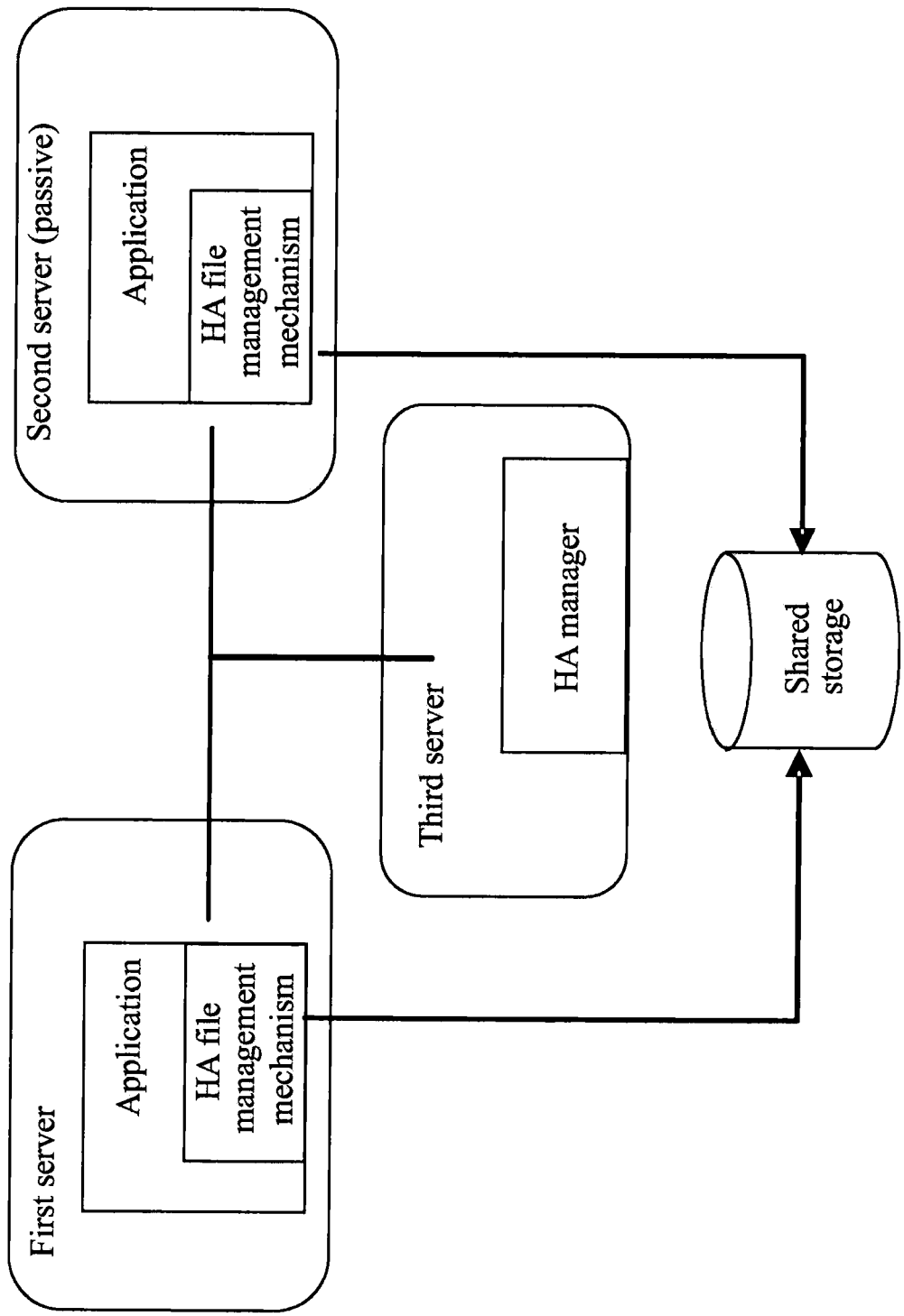
FIG. 1 schematically illustrates a prior art solution for implementing HA of an application.
Figure 2:
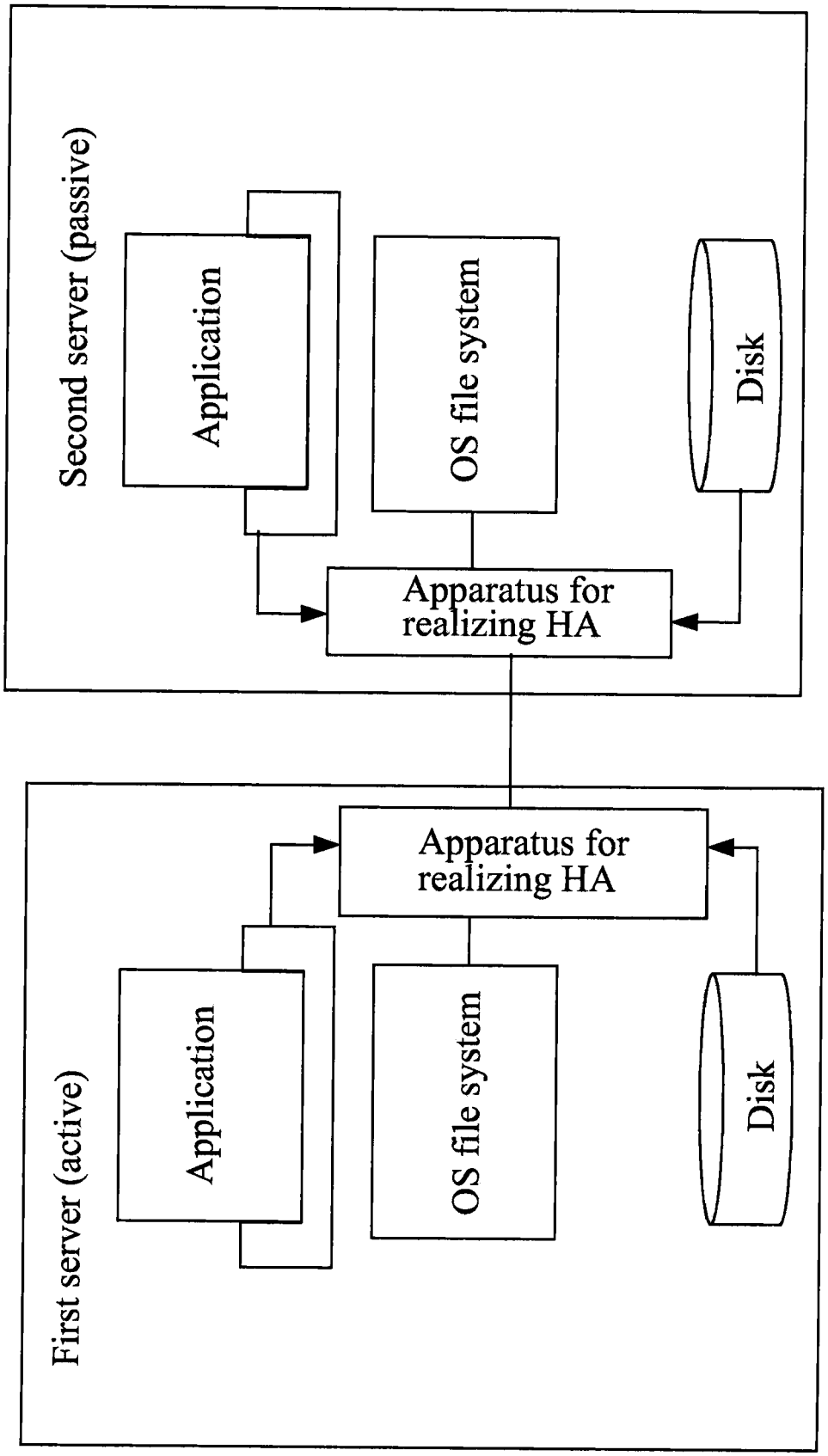
FIG. 2 schematically illustrates the basic concept of the present invention.

FIG. 2 schematically illustrates the basic concept of the present invention. As shown, an HA application is installed on an active server and a passive server respectively, and the apparatus for realizing application HA of the present invention is also installed on the active server and the passive server respectively. The apparatus for realizing application HA of the present invention is not specific to an application, rather it resides outside applications, and can be used to realize HA of any application.

On the active server, during the execution of the application, the apparatus for realizing application HA interacts in a transparent way with the application, the OS file system and disks respectively, and is responsible for replication of updated files, IP address switching, and application initiation. Specifically, the interactions include: monitoring access to files by the application during the execution of the application on the active server; replicating the updates to files by the application from the active server to the passive server or a shared storage between the active server and the passive server; sniffing the execution of the application on the active server; and in response to sniffing a failure in the execution of the application on the active server, switching to the passive server, and initiating the application on the passive server.

Figure 3:
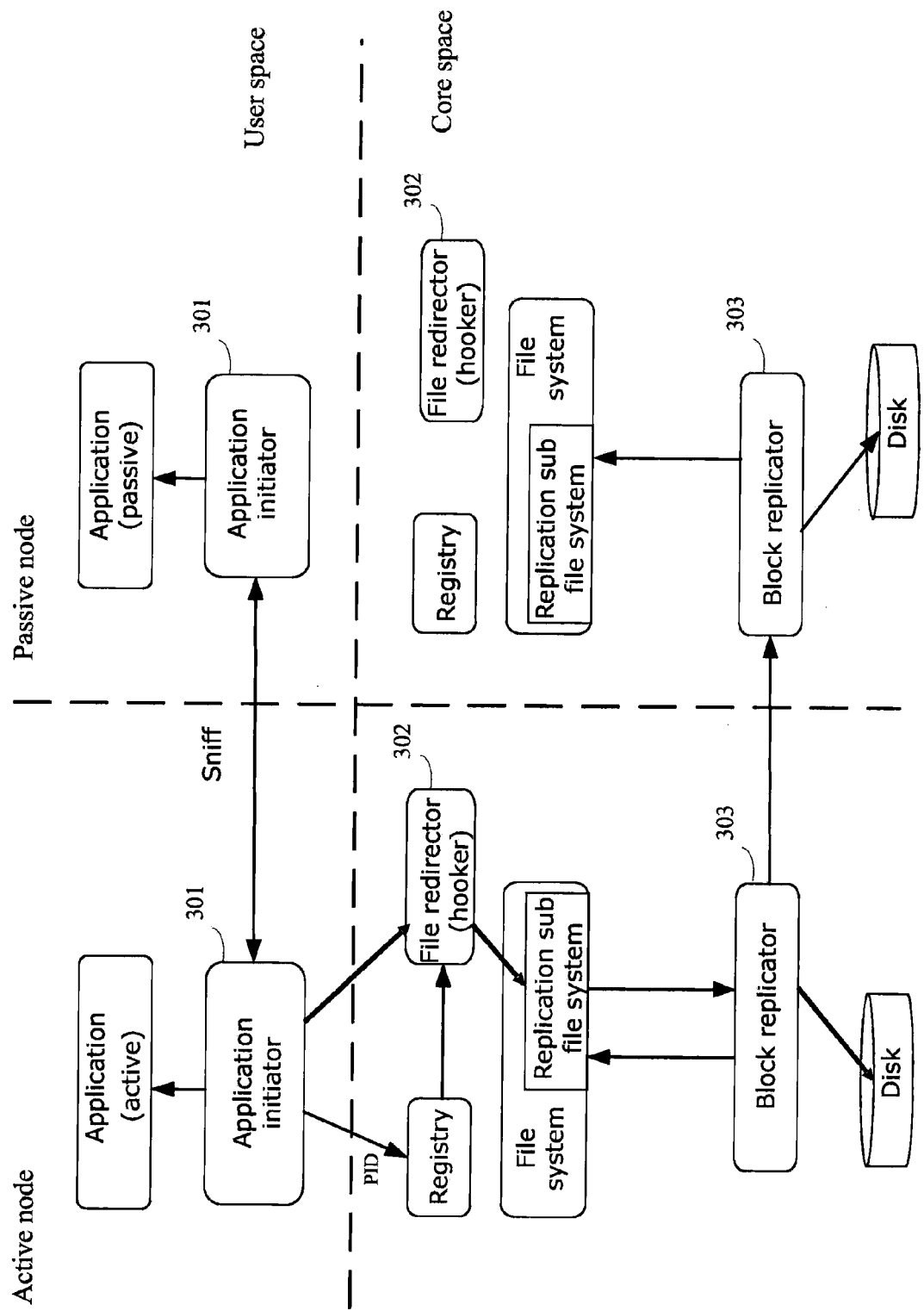
FIG. 3 schematically illustrates the architecture of an embodiment of the present invention.

FIG. 3 illustrates the architecture of an embodiment of the present invention. As shown, a same application is installed on an active node and a passive node respectively, and the same modules in the apparatus for realizing application HA of the present invention are also installed on the active node and the passive node respectively. In this way, when the active node is switched to the passive node in response to a failure of the active node, and the application is initiated on the passive node, the passive node becomes a new active node, and the original active node may become a new passive node after failure recovery.

The apparatus for realizing application HA of the present invention includes modules in the user space and core space on the active node and passive node. In the user space, there is an application initiator 301. In the core space, there are a file redirector 302 and block replicator 303.

The application initiator 301 is used to initiate an application, and register the ID, such as the process ID (PID), of the initiated application, for use by the file redirector 302. That is, the ID of each application initiated by the application initiator 301 will be registered, and thus the application may be regarded as an HA application. The application initiator 301 is further used to, after the application has been failed over to the passive node, sniff the execution of the application on the passive node which has become a new active node, and when the execution of the application on the new active node fails, initiate the application on the original active node.

The file redirector 302 is used to intercept file access system calls during the execution of an application through a file operation hook, determine from the application ID of the application whether the application is a registered application initiated by the application initiator 301, i.e. an HA application, and in response to determining that the application is an HA application, redirect the file access operations of the application to a replication sub file system created in advance. All the write operations to the replication sub file system will be recorded in a block device associated with the block replicator 303.

The block replicator 303 is used to monitor write operations on the block device in the replication file system, and replicate the content of the block device mounted on the replication sub file system to a corresponding block device in the passive node in the manner of block replication. The block device can be a disk, or a logical partition. The replication sub file system may be created on the server before installing the application on the server, and then the block device may be mounted on the replication sub file system, and the creation of the replication sub file system and the mounting of the block device on the replication sub file system should be performed on both the active node and the passive node.

The block replicator 303 can be implemented by a disk operation hook hooked in the operating system. For example, in the Linux system, kprobe is used to hook a disk operation hook on the ll_rw_block ( ) function. In this way, whenever the file system writes an update to a file to the block device by invoking a write disk function, the hook is invoked. If determining that the block to be written into is a block device mounted on the replication sub file system, the hook may replicates remotely the data updates to the block device on the active node to the block device on the passive node. The hook may use any of a number of remote disk synchronization tools or methods known in the art to perform the remote replication of the block device.

Figure 4:
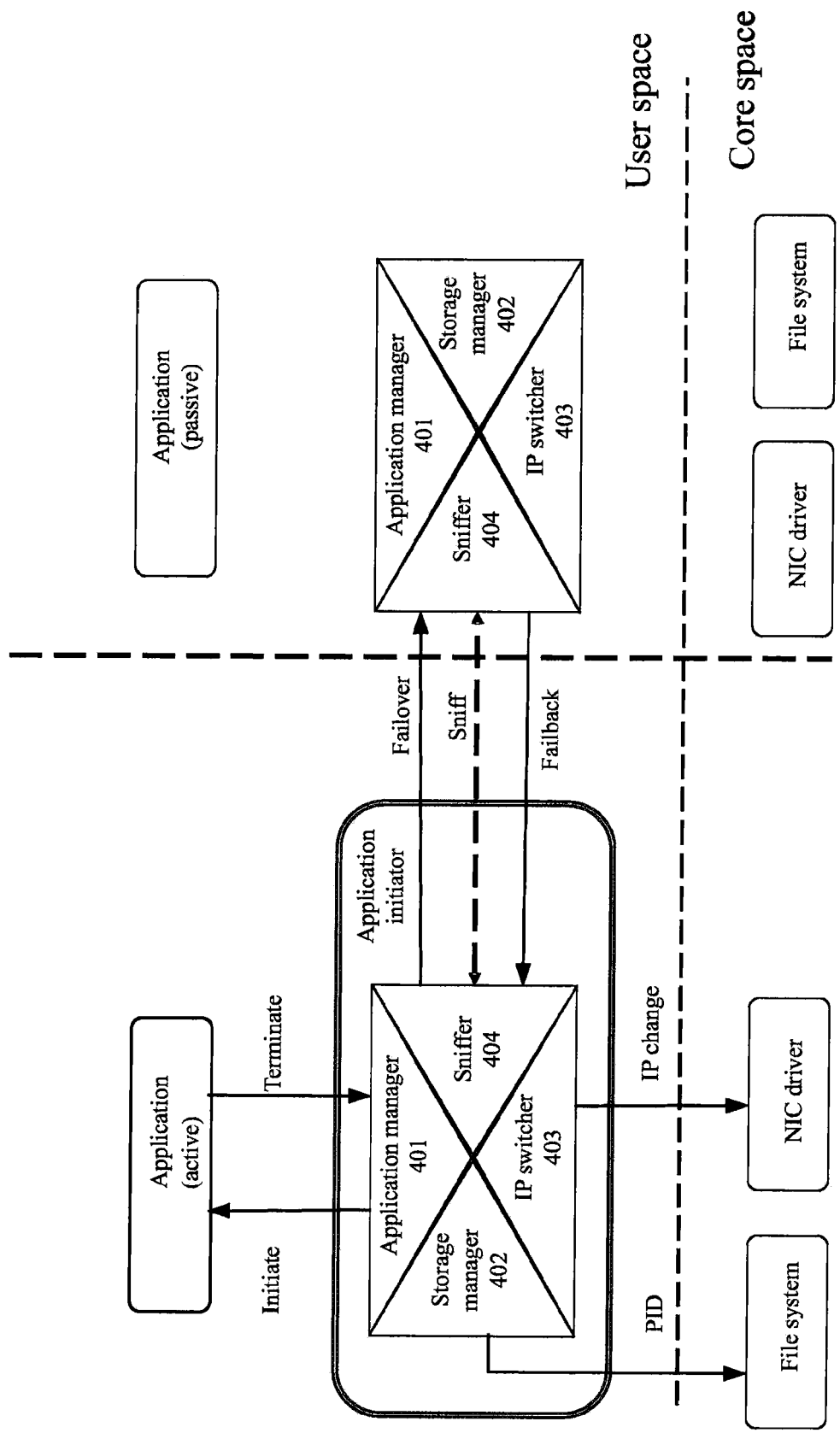
FIG. 4 illustrates a specific implementation of an application initiator in accordance with an embodiment of the present invention.

FIG. 4 illustrates a specific implementation of the application initiator according to an embodiment of the present invention. As shown, the application initiator 301 resides on each node, and includes an application manager 401, a storage manager 402, an IP switcher 403 and a sniffer 404.

The application manager 401 is used to initiate and terminate an application. The path, the name of the executable file and the execution parameters of the application may be transferred to the application manager 401 through command line options or a configuration file, and the application manager 401 may create a child process to initiate the application based on this information, obtain the process ID of the application, and may terminate the application when needed according to the process ID.

The storage manager 402 is used to register an identifier of the application, such as the process ID, in a registry pre-allocated in the core space, for use by the file redirector 302 to determine whether the application is an HA application.

The IP switcher 403 is used to modify the IP address of the node where it is through a network card driver. For example, the IP switcher 403 on the passive node may modify the IP address of the passive node into the IP address of the active node in response to the sniffer 404 sniffing an application failure on the active node, or the IP switcher 403 on the active node may modify the IP address of the active node into the original IP address in order to fail over again in response to the sniffer 404 sniffing the application failed over to the passive node fails again.

The sniffer 404 is used to sniff the execution status of the application on the other node, and when the application on the other node fails, initiate a fail-over process, including initiating the application on the node where it is through the application manager 401, and switching the IP address for the application to the resident node through the switcher 403. The sniffer 404 may used any of a number of sniffing methods or tools known in the art to sniff the execution status of the application on the other node.

While only operations performed by the modules on one node are illustrated and described in FIG. 4 and the above description, it is obvious that when the other node becomes the active node, the modules on the other node may perform the same operations. The passive node is a mirror of the active node. For the convenience of illustration, in the drawings and the description only relevant details of the active node are illustrated, and those skilled in the art may understand thoroughly the relevant operations of the passive node after it has been converted into an active node from the illustration of the active node.

Figure 5:
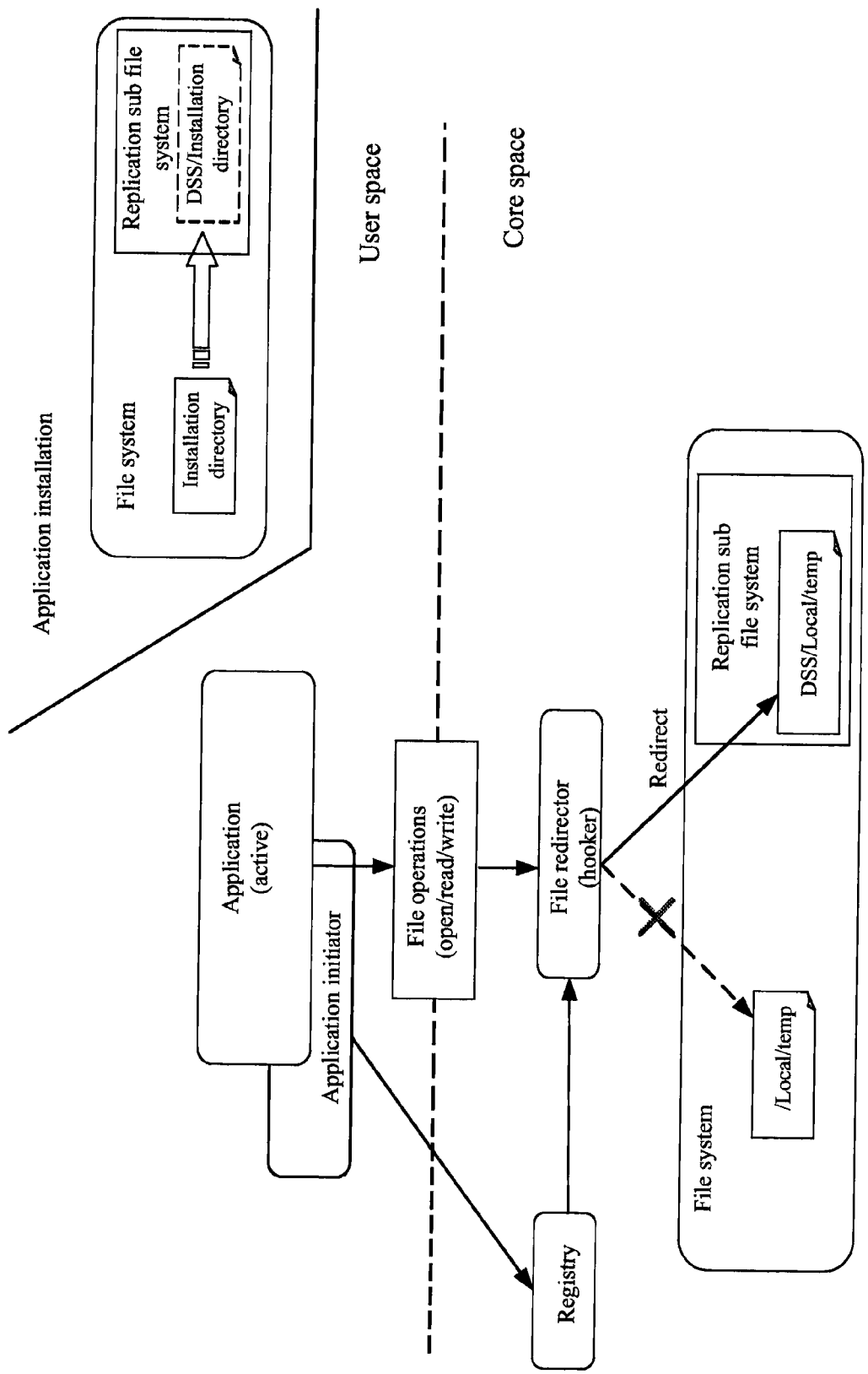
FIG. 5 is a working schematic diagram of a file redirector in accordance with an embodiment of the present invention.

FIG. 5 illustrates a working schematic diagram of the file redirector in accordance with an embodiment of the present invention. As shown in the upper right part of drawing, a sub file system for replication has been created in the file system. In accordance with an embodiment of the present invention, when the application is installed, the application is directly installed in this replication sub file system. In accordance with another embodiment of the present invention, when the application is installed, the application need not be installed in the sub file system, rather, the application may be installed outside the sub file system.

Additionally, it is to be noted that the creation of the replication sub file system in the file system, and the installation of the application inside or outside the replication sub file system should be performed both on the active node and the passive node correspondingly. That is, the replication sub file system should be created both on the active node and the passive node; and if the application is installed in the replication sub file system on the active node, the application should be also installed in the replication sub file system on the passive node; and if the application is installed outside the replication sub file system on the active node, the application should be also installed outside the replication sub file system on the passive node The file redirector 302 is used to intercept the file access system calls, including file open, file read, and file write, of the application through a hook, determine whether the application is an HA application according to the HA registry in the core space and the application ID of the application, and in response to determining the application is an HA application, redirect the accesses to files in the file system outside the replication sub file system by the application to the replication sub file system. In an embodiment of the present invention where an application is installed directly in the replication file sub system, only the accesses to files outside the installation directory by the application need to be redirected to the replication sub file system.

In an embodiment of the present invention where an application is installed outside the replication file system, the accesses to all files by the application need to be redirected to the replication sub file system. For example, as shown, assuming the pathname of the replication sub file system is DSS, and the application accesses a file with the path /Local/temp, the file redirector 302 may redirect the access to the file to a file with a corresponding path DSS/Local/temp in the replication sub file system.

Figure 6:
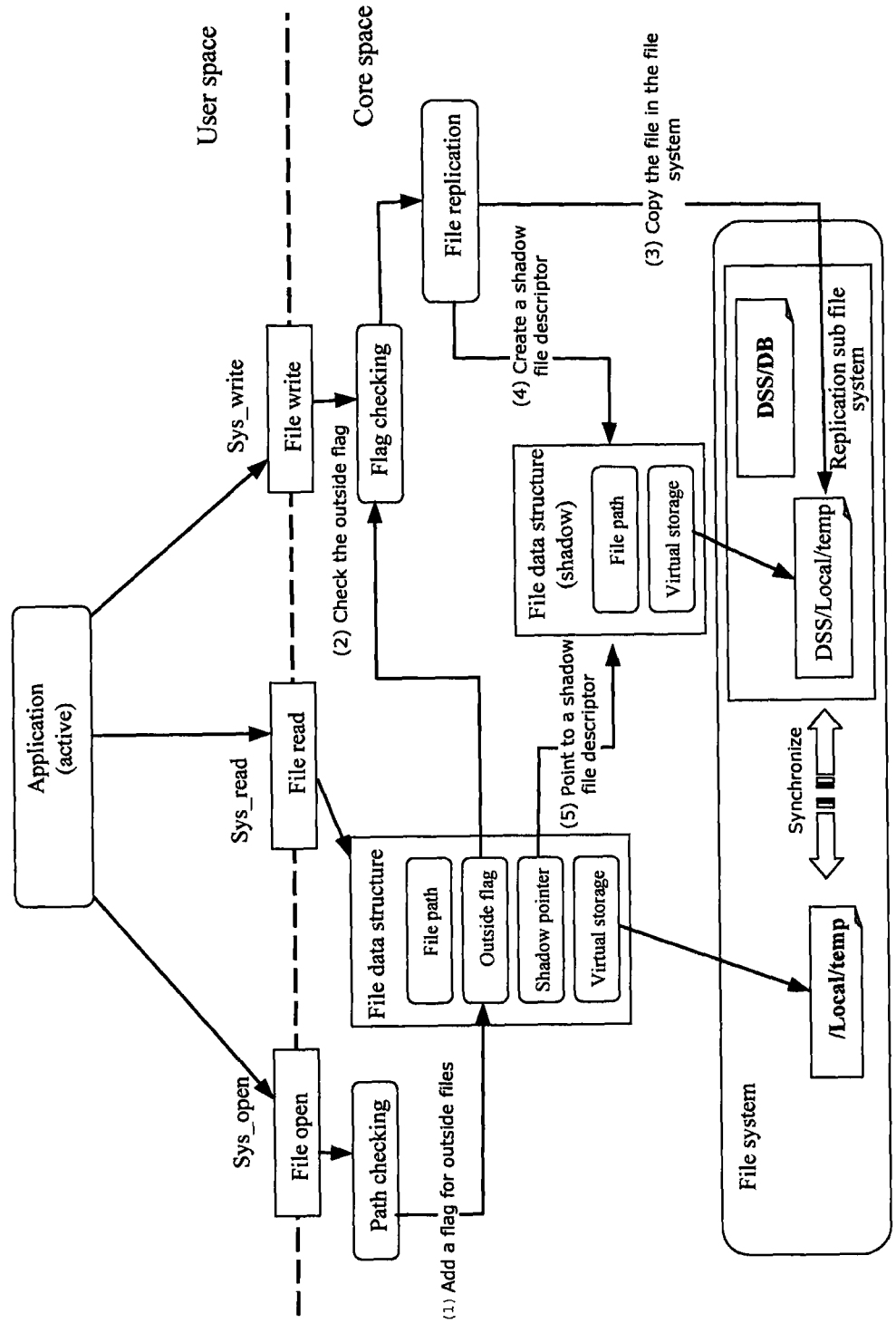
FIG. 6 illustrates a specific implementation of a file redirector in accordance with an embodiment of the present invention.

FIG. 6 illustrates a specific implementation of the file redirector 302 in accordance with an embodiment of the present invention. As shown, file access operations (including file open, file read and file write) of the application during its execution will generate corresponding file access system calls. The embodiment of the present invention utilizes the hooking mechanism provided by the operating system to intercept the file access system calls, and implements the file redirector 302 thorough a hook inserted in each file system call. For example, in Linux, the Kprobe mechanism is used to intercept the file open (sys_open), read (sys_read) and write (sys_write) operations, and a corresponding file operation hook is inserted.

For the file open system call, the hook may first check the path of the file to be opened, and if the path of the file resides outside the replication sub file system, an outside flag will be added in the file data structure of the file descriptor of the file created in the memory by the operating system. For the first file write system call on a file, the hook may check whether there is the outside flag in the file data structure of the file, and if there is the outside flag, copy the file from the outside the replication sub file system into the replication sub file system, for example, replicating the file /local/temp to DSS/local/temp, and create in the memory a file data structure, called shadow file data structure, of the file descriptor associated with the copy file in the replication sub file system, and then add a pointer, called shadow pointer, pointing to the shadow file data structure, in the file data structure of the original file descriptor.

Thereafter, whenever a file write system call on the file is intercepted once again, besides utilizing the data structure of the file descriptor of the file to write into the file outside the replication sub file system, the shadow file data structure is found through the shadow pointer in the file data structure, and the shadow file data structure is used to write into the copy file in the replication sub file system. In this way, the replication sub file system will keep all updated files updated by the application.

Apart from adding the shadow pointer in the original file descriptor data structure, another possible method is to create a shadow file association table in the core space, and when the shadow file data structure is created, its association with the original file descriptor data structure is added in the association table. When a file is written, the shadow file data structure associated with the current file is found through the association table.

Figure 7A:
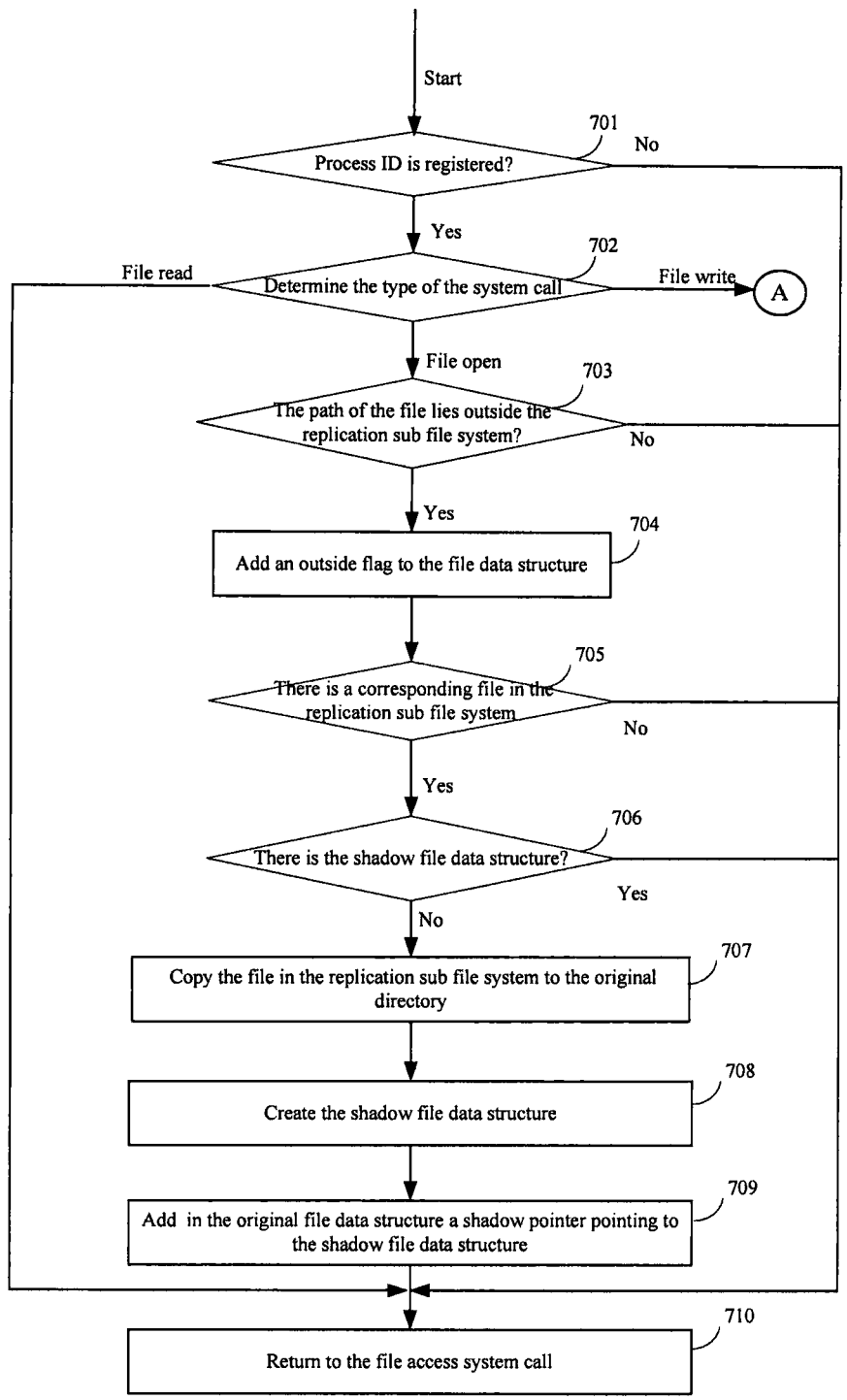
FIG. 7 illustrates a flow of operations performed by a file redirector implemented by a hook in accordance with an embodiment of the present invention.
Figure 7B:
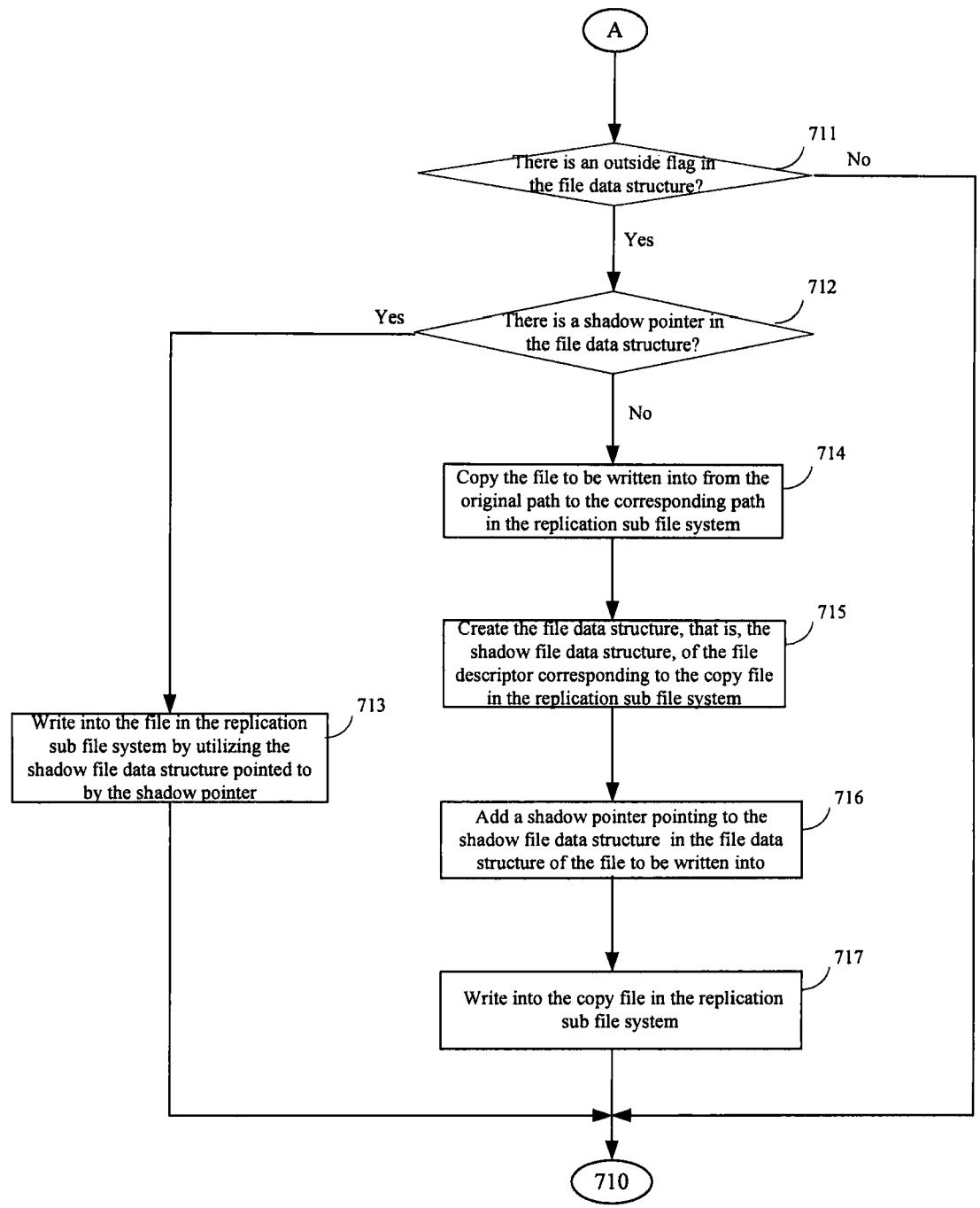

Referring now to FIG. 7, there is illustrated more specifically the flow of operations performed by the file redirector implemented by a file operation hook in accordance with an embodiment of the present invention.

When the file operation hook is invoked by a file access system call generated during the execution of an application, first in step 701 the process ID of the application is checked, and it is determined from the HA registry whether the process ID belongs to the registered process ID of an application initiated by the application initiator 301.

If the determination is No, indicating the application is not an HA application, the flow proceeds to step 710, to return to the file access system call from the hook, in order to perform normal file open processing.

If the determination is Yes, indicating the application is an HA application, the flow proceeds to step 702, to further determine the type of the file access system call.

In response to determining the type of the file access system call is file open in step 702, the flow proceeds to 703, to further determine whether the path of the file to be opened lies outside the above mentioned created replication sub file system.

If the determination in step 703 is No, indicating the path of the file to be opened lies within the created replication sub file system, the flow proceeds to step 701, to return from the hook to the file access system call to perform normal file open processing.

If the determination in step 703 is Yes, indicating the path of the file to be opened lies outside the created replication sub file system, the flow proceeds to step 704, to add an outside flag in the file data structure of the file descriptor for the file created in the memory by the operating system.

Then, in step 705 it is determined whether there is a file with a path corresponding to the path of the file to be opened in the replication sub file system. For example, assuming the path of the file to be opened is /Load/temp, it is determined whether there is a file with the path DSS/Local/temp in the replication sub file system.

If the determination is Yes, the flow proceeds to step 706, to determine whether there is a file data structure, also called shadow file data structure, for the corresponding file in the replication sub file system.

If the determination in step 706 is No, that is, there is no shadow file data structure in the memory, in step 707 the file in the replication sub file system is copied to the original directory, that is, to the corresponding path outside the replication sub file system. For example, the file DSS/Local/temp is copied to /Local/temp.

Then, in step 708, the file data structure, that is, the shadow file data structure, of the corresponding file in the replication sub file system is created in the memory. The data entries contained in the created file data structure is specific to the operating system, and typically include information on the file path, virtual storage location, etc.

Next, in step 709, a shadow pointer pointing to the created shadow file data structure is added in the original file data structure (that is, the file data structure of the file descriptor corresponding to the opened file).

If the determination is step 706 is Yes, that is, there is already a shadow file data structure in the memory, or the determination is step 705 is No, that is, there is no file with a path corresponding to the path of the file in the replication sub file system, the flow proceeds to step 710, to return from the hook to the file access system call.

On the other hand, in response to determining in step 702 that the type of the file access system call is file read, the flow proceeds to step 710, to return from the hook to the file access system call to perform normal file read processing.

Further, in response to determining in step 702 that the type of the file access system call is file write, the flow proceeds to step 711, to determine whether there is an outside flag in the file data structure of the file descriptor created in the memory by the operating system for the file.

In response to the determination in step 711 is No, the flow proceeds to step 710, to return from the hook to the file access system call to perform normal file read processing.

In response to the determination in step 711 is Yes, the flow proceeds to step 712, to further determine whether there is a shadow pointer in the file data structure.

In response to the determination in step 712 is Yes, the flow proceeds to step 713, to write into the corresponding file in the replication sub file system utilizing the shadow file data structure pointed to by the shadow pointer in the file data structure.

Then, the flow proceeds to step 710, to return from the hook to the file access system call, to perform normal file write processing.

In response to the determination in step 712 is No, the flow proceeds to step 714, to copy the file to be written into from the original path to the corresponding path in the replication sub file system.

Then, in step 715, the file data structure, that is, the shadow file data structure, of the file descriptor corresponding to the copy file in the replication sub file system is created.

Next, in step 716, a pointer, that is, shadow pointer, pointing to the shadow file data structure is added in the file data structure of the file to be written into.

Next, in step 717, the write operation is performed on the copy file in the replication sub file system.

Then, the flow proceeds to step 700, to return from the hook to the file access system call to perform normal file write processing.

Figure 8:
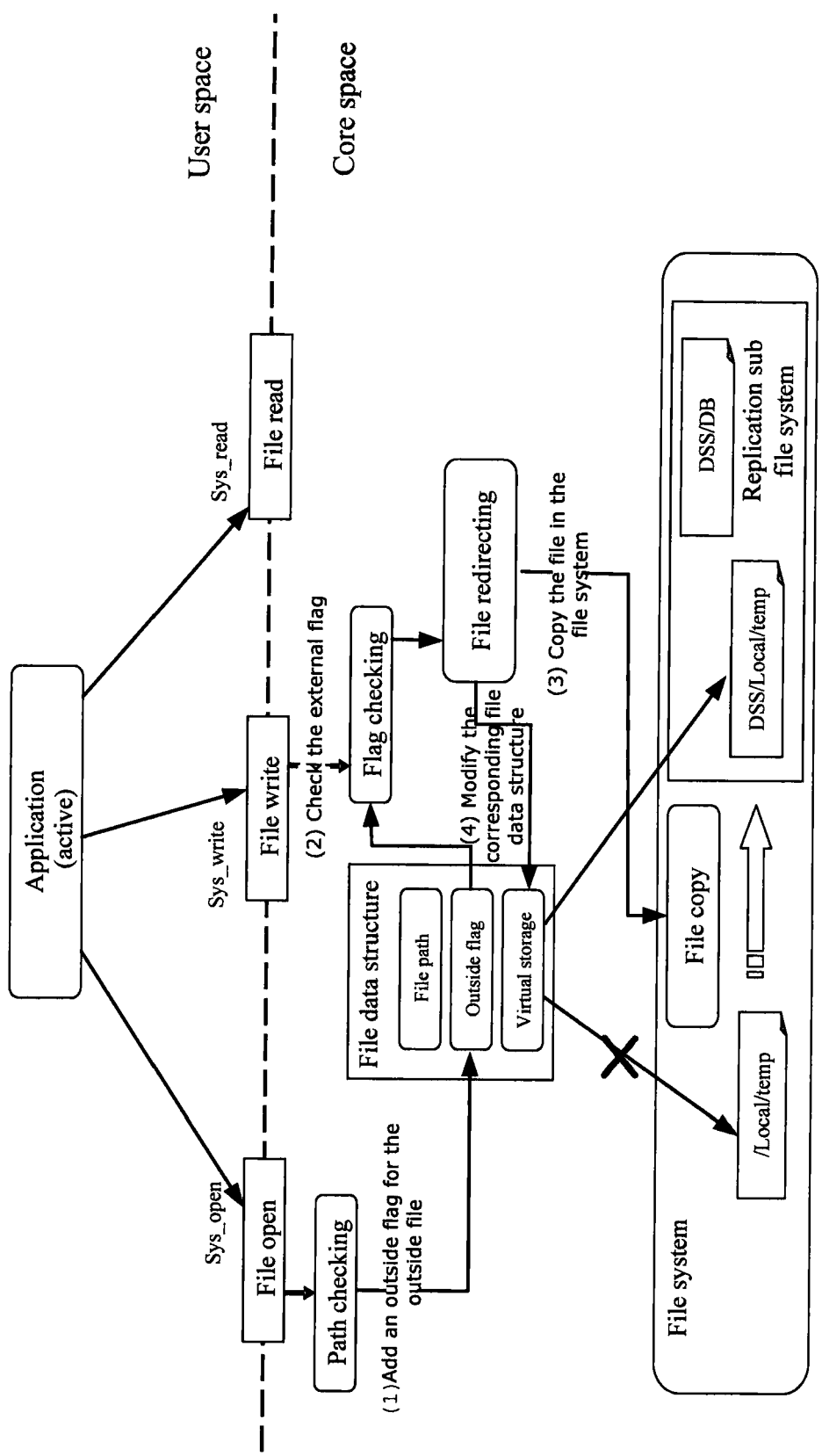
FIG. 8 illustrates a specific implementation of a file redirector in accordance with another embodiment of the present invention.

FIG. 8 illustrates a specific implementation of the file redirector in accordance with another embodiment of the present invention. As shown, the file redirector is implemented by a file operation hook inserted into each file access system call. For the file open system call, the file operation hook may first check the path of the file to be opened, and if the path of the file lies outside the replication sub file system, add an outside flag to the file data structure of the file descriptor of the file in the memory created by the operating system.

For the file write system call, the file operation hook may check whether there is an outside flag in the file data structure of the file, and if there is an outside flag, copy the file from outside the replication sub file system into the replication sub file system, for example, copying the file /local/temp to DSS/local/temp, and modify the file data structure of the file descriptor of the file to make it associated with the copy file in the replication sub file system.

Thereafter, whenever the file is rewritten into, the modified data structure of the file descriptor will be utilized to directly write into the copy file in the replication sub file system, no longer writing into the original file outside the replication sub file system any longer. In this way, all updates to the file by the application will be kept in the replication sub file system.

Figure 9A:
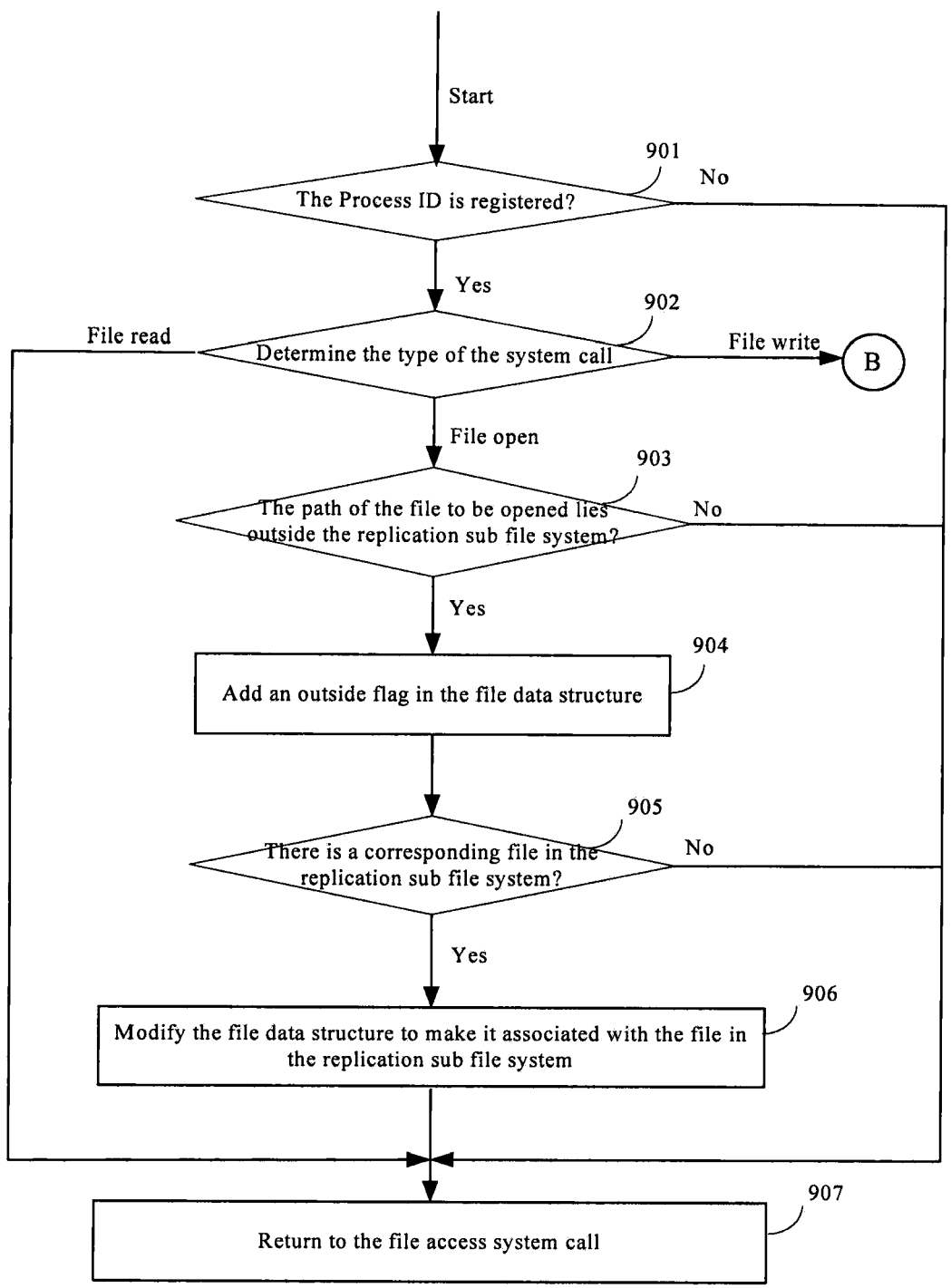
FIG. 9 illustrates a flow of operations performed by a file redirector implemented by a hook in accordance with another embodiment of the present invention.
Figure 9B:
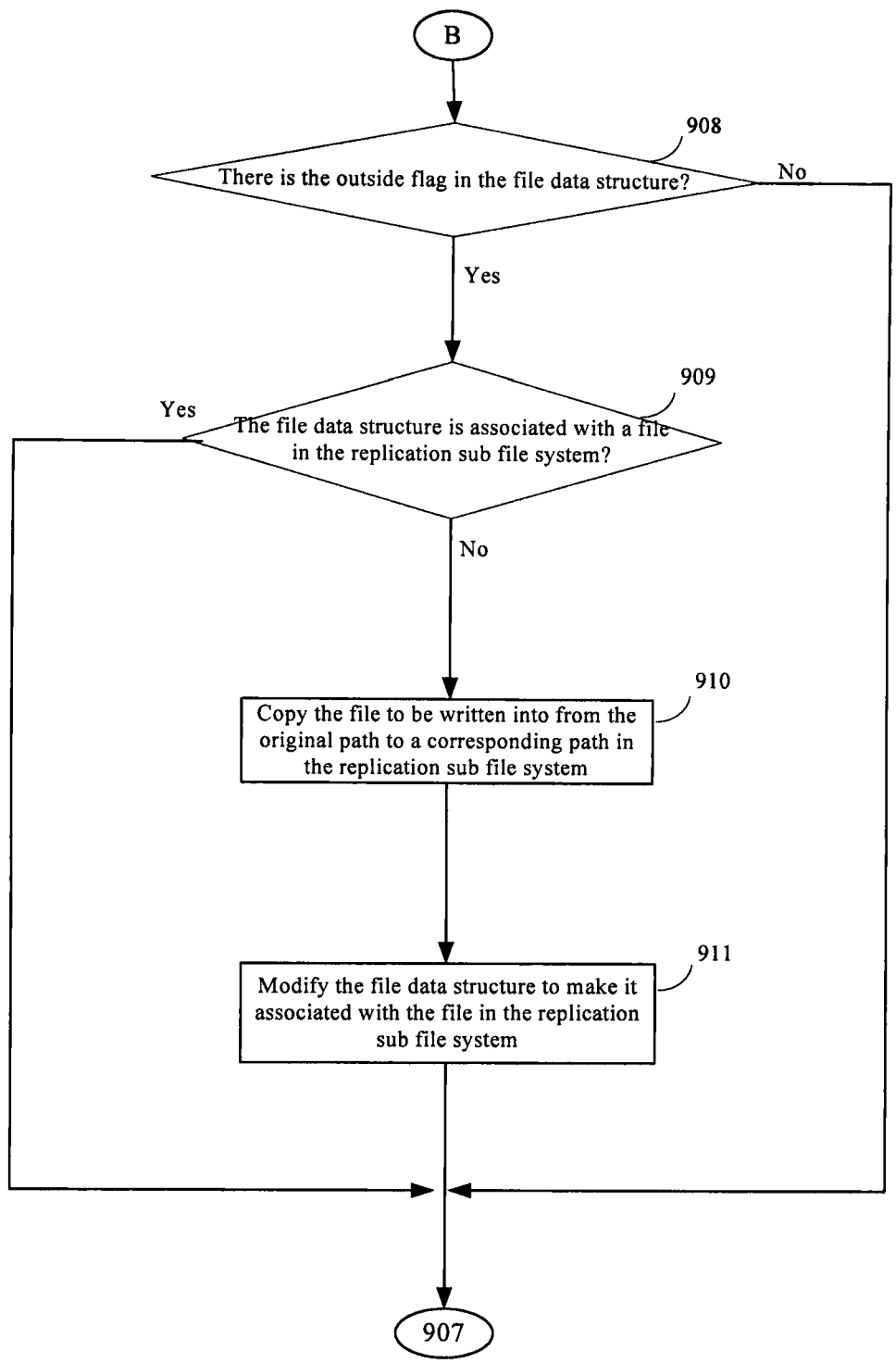

Referring now to FIG. 9, there is illustrated more specifically a flow of operations performed by the file redirector implemented by the file operation hook in accordance with another embodiment of the present invention.

As shown, when the hook is invoked by a file access system call generated during the execution of the application, it may first check in step 901 the process ID of the application, and determine from the HA registry whether the process ID belongs to the registered process ID of an application initiated by the application initiator 301.

If the determination is No, indicating the application is not an HA application, the flow proceeds to step 907, to return from the hook to the file access system call to perform normal file access processing.

If the determination is Yes, indicating the application is an HA application, the flow proceeds to step 902, to further determine the type of the file access system call.

In response to determining in step 902 that the type of the file access system call is file open, the flow proceeds to step 903, to further determine whether the path of the file to be opened lies outside the above mentioned created replication sub file system.

If the determination in step 903 is No, indicating the path of the file to be opened lies within the created replication sub file system, the flow proceeds to step 907, to return from the hook to the file access system call to perform normal file open processing.

If the determination in step 903 is Yes, indicating the path of the file to be opened lies outside the replication sub file system, the flow proceeds to step 904, to add an outside flag in the file data structure of the file descriptor for the file created in the memory by the operating system.

Then, in step 905, it is determined whether there is a file with a path corresponding to the path of the file to be opened in the replication sub file system, for example, assuming the path of the file to be opened is /Local/temp, whether there is a file with the path /DSS/Local/temp in the replication sub file system.

If the determination in step 905 is No, the flow proceeds to step 907, to return from the hook to the file access system call to perform normal file open processing.

If the determination in step 905 is Yes, the flow proceeds to step 906, to modify the file data structure of the file, for example, modifying the virtual storage location information in the file data structure to make it associated with the file in the replication sub file system.

Then the flow proceeds to step 907, to return from the hook to the file access system call to perform normal file open processing.

On the other hand, in response to determining in step 902 that the type of the system call is file read, the flow proceeds to step 907, to return from the hook to the file access system call to perform normal file read processing.

And in response to determining in step 902 that the type of the system call is file write, the flow proceeds to step 908, to determine whether the file data structure of the file descriptor for the file created in the memory by the operating system contains the outside flag.

In response to the determination in step 908 is No, the flow proceeds to step 907, to return from the hook to the file access system call to perform normal file read processing.

In response to the determination in step 908 is Yes, the flow proceeds to step 909, to determine whether the file data structure is associated with a file in the replication sub file system.

If the determination in step 909 is Yes, the flow proceeds to step 907, to return from the hook to the file access system call to perform normal file read processing, including writing into the file in the replication sub file system using the file data structure.

If the determination in step 909 is No, the flow proceeds to step 910, to copy the file to be written into from the original path to the corresponding path in the replication sub file system.

Then, in step 911, the file data structure is modified, such as modifying the virtual storage location information in the file data structure, to make it associated with the file in the replication sub file system.

In case where the operating system allows a same file to be opened multiple times simultaneously, there may be multiple file descriptors and their file data structures corresponding to the same file, so in step 911, all the file data structures of the file descriptors corresponding to the file need to be modified to be associated with the copy file in the replication sub file system.

This may be done in the following way: an outside file list is maintained in the memory, and whenever the outside flag is added to the file data structure of the file descriptor in step 904, the file descriptor is also added to the outside file list. The outside file list will record all the file descriptors of all the opened outside files. When in step 911 the file data structure of the current file descriptor of the current file is modified, all the file descriptors of the current file are looked up in the outside file list and the file data structures of all the found file descriptors are modified to be associated with the copy file in the replication sub file system.

Then, the flow proceeds to step 907, to return from the hook to the file access system call to perform normal file read processing, including writing into the copy file in the replication sub file system using the file data structure.

It is to be noted that the specific implementation of the file redirector 302 in accordance with an embodiment of the present invention and the details of the flow of operations performed thereby as described above is only an exemplary illustration. In other embodiments of the present invention, the file redirector 302 may adopt other implementation, and the flow of operations performed thereby may have more, less or different steps, or steps in different order. In fact, provided only that the file redirector 302 can copy or redirect updates of a file by an application to a replication sub file system, in order to be block replicated remotely to the passive node, all variations are within the spirit and scope of the present invention.

Figure 10:
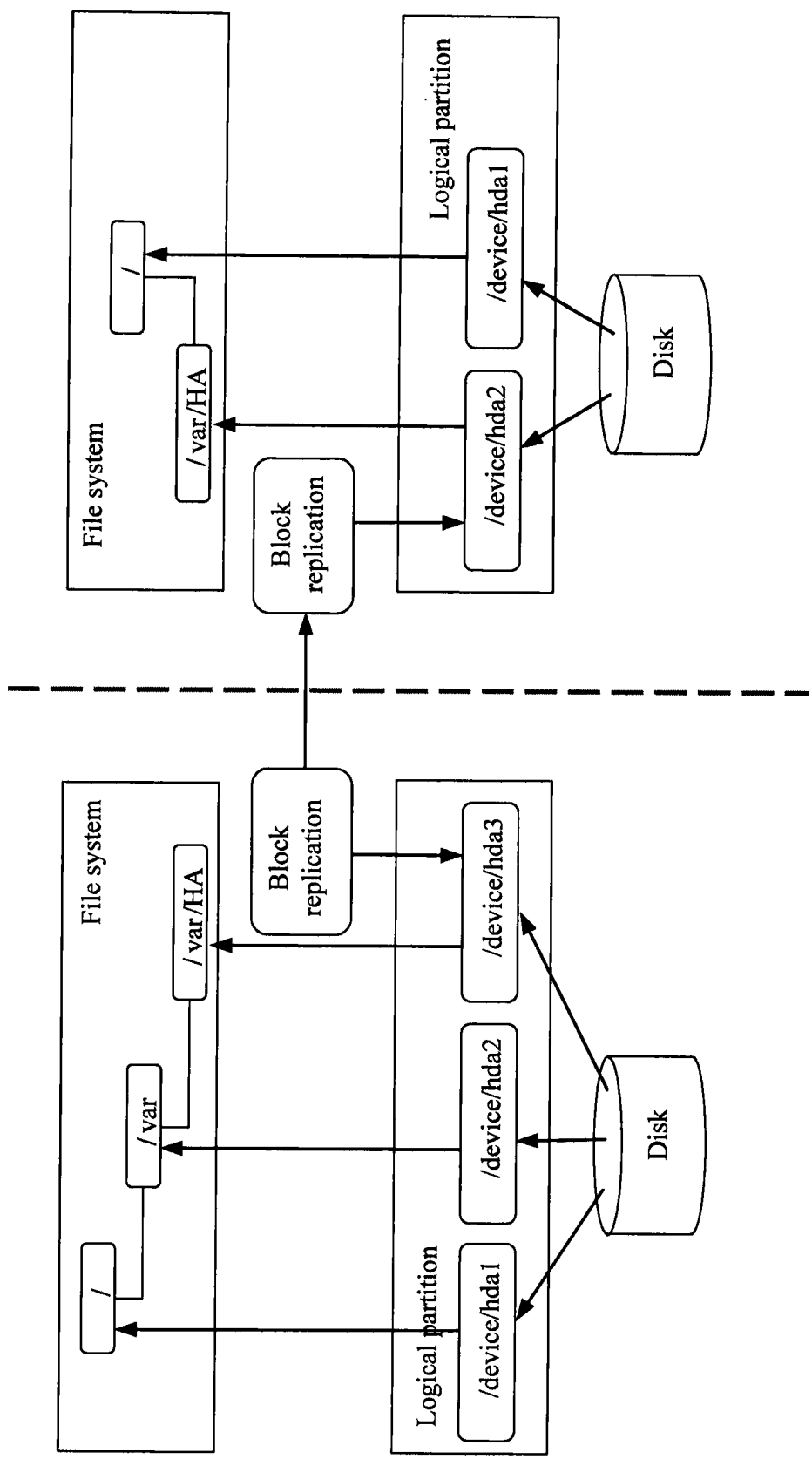
FIG. 10 is a schematic diagram of block replication performed in accordance with an embodiment of the present invention.

FIG. 10 is a schematic diagram of the block replication performed in accordance with an embodiment of the present invention. As shown, the replication sub file system created on the active node is /var/HA, and the logical partition /device/hda3 is mounted on the replication sub file system /var/HA. The replication sub file system created on the passive node is /var/HA, and the logical partition /device/hda2 is mounted on the replication sub file system /var/HA.

When the file system in the active server write updates to a file to the disk /device/hda3 by invoking a write disk function, the block replicator hooked on the function is initiated. The block replication process performed by the block replicator 303 may replicate the updates in the disk /device/hda3 on the active server to the disk /device/hda2 on the passive sever, to make the data in the two disks completely the same, thus making the content of the replication sub file system /var/HA on the active node and the content of the replication sub file system /var/HA on the passive node completely the same.

Figure 11:
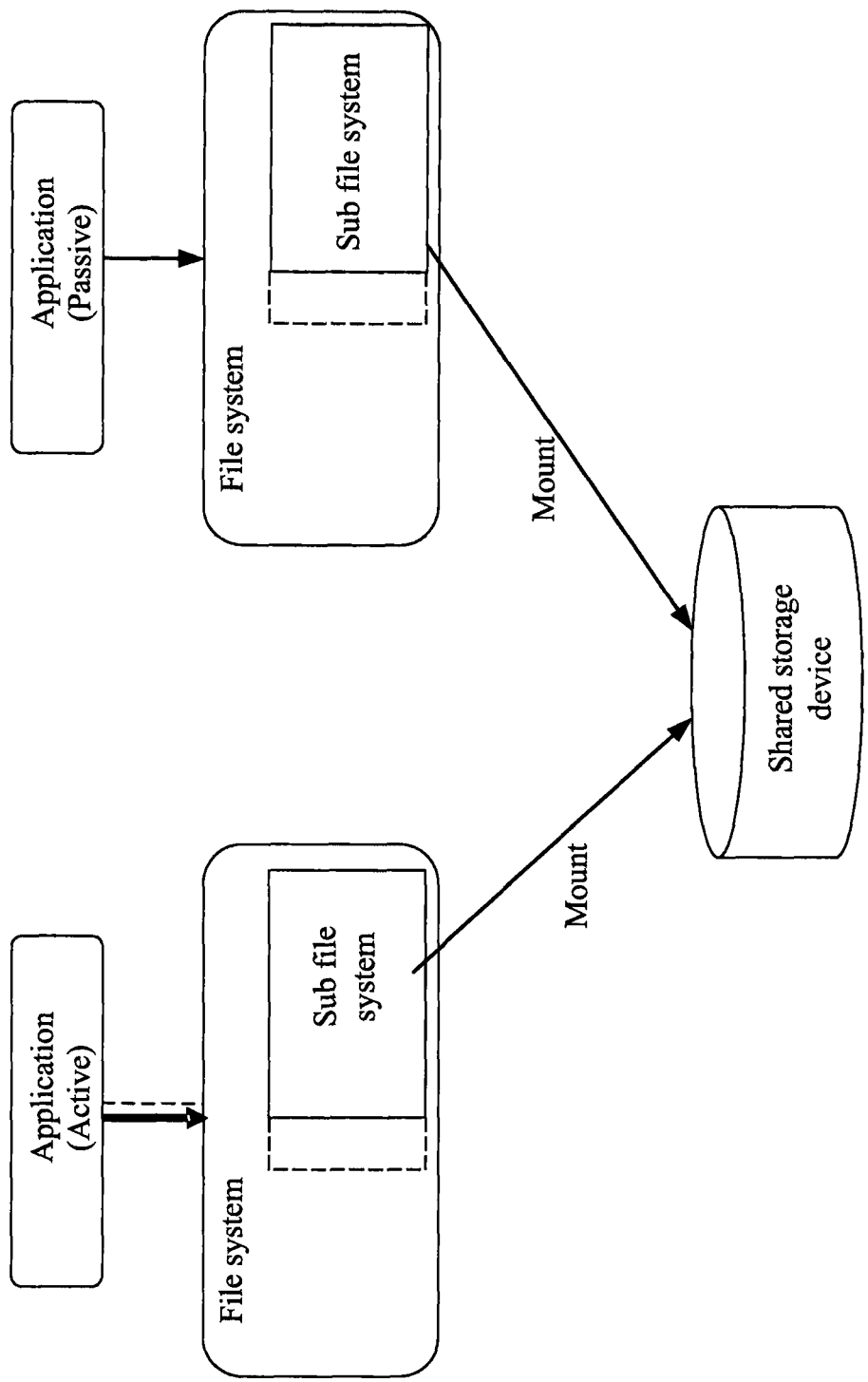
FIG. 11 is a schematic diagram of another embodiment of the present invention.

FIG. 11 is a schematic diagram of another embodiment of the present invention. In this embodiment, the storage device shared between the active node and the passive node is mounted respectively on the replication sub file system on the active node and the replication sub file system on the passive node. Thus, after an application on the active node writes updates to a file into the replication sub file system during its execution, the application on the passive node can access directly the update data in the shared storage device after initiation. In such an embodiment, the block replication is unnecessary, and the apparatus for realizing application HA may not include the block replicator 303.

While apparatus for realizing application HA and the modules thereof in accordance with an embodiment of the present invention has been described, the above description is only an illustration of the present invention. In other embodiments of the present invention, the apparatus may have more, fewer or different modules, and the modules may be implemented in different ways.

For example, in some embodiments of the present invention, the apparatus may not include the file redirector 302 and the block replicator 303, rather, after sniffing an update to a file by the application on the active node, it directly replicate the update to the file remotely to a corresponding file on the passive node. In addition, the various modules and sub-modules and their functions as described above can be divided and combined in different ways. For example, the application manager 401, storage manager 402, IP switcher 403, sniffer 404 in the application initiator 301 may all be a separate module, and the monitoring function of the file redirector 303 may also be performed by a separate monitoring module.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which includes all the features enabling the implementation of the methods described herein, and which when loaded in a computer system is able to carry out these methods.

While the present invention has been described and illustrated specifically by referring to preferred embodiments, those skilled in the art will understand that variations both in form and detail can be made thereof without departing from the spirit and scope of the present invention.

The invention claimed is:

1. A computer implemented method for realizing high availability of an application installed on a first node and a second node, the method comprising:
   determining whether an application is a high availability application based on an ID of the application; and
   performing a file replication process based on a determination that the application is a high availability application, the file replication process comprising:
      monitoring access operations to files by the application during execution of the application on the first node; and
      replicating a monitored update to a file by the application if the application performed an update to the file during the access operations, such replication being from the first node to a storage device accessible by the second node;
   sniffing execution of the application on the first node; and
   switching the application to, and initiating the application on, the second node in response to sniffing a failure in the execution of the application on the first node.

2. The method according to claim 1, wherein, a first sub file system is created on the first node and a first dedicated block device is mounted on the first sub file system, and a second sub file system is created on the second node and a second dedicated block device is mounted on the second sub file system:
   wherein the replicating step includes replicating the updates in the first dedicated block device to the second dedicated block device; and
   wherein the method further comprises redirecting monitored updates to the file by the application to the first sub file system.

3. The method according to claim 2, wherein replicating the updates in the first dedicated block device to the second dedicated block device is implemented by a disk operation hook that is hooked into the operating system, and wherein the hook is initiated whenever an update to a file is written into the first dedicated block device.

4. The method according to claim 2, wherein redirecting monitored updates to the file by the application to the first sub file system comprises:
   copying the file from outside the first sub file system into the first sub file system in response to the first monitored update to a file outside the first sub file system;
   creating in the memory a file data structure of the file descriptor associated with the copy file in the first sub file system; and
   writing monitored updates to the file outside the first sub file system by the application to the copy file within the first sub file system by using the file data structure.

5. The method according to claim 1, wherein the ID is a process ID of the application.

6. The method according to claim 1, further comprising:
   registering, by the first node, the ID of the application in a registry in response to the application being initiated by a dedicated initiator;
   wherein determining whether the application is a high availability application includes:
   determining whether the ID of the application is in the registry in response to receiving a file access request from an application; and
   determining the application to be a high availability application based on determining the ID of the application is in the registry.

7. The method according to claim 2, wherein monitoring access operations to files by the application and redirecting updates to the file by the application to the sub file system are implemented by a file operation hook that is hooked onto file access system calls of the operating system.

8. The method according to claim 2, wherein:
   redirecting monitored updates to the file by the application to the first sub file system includes redirecting the monitored access operations to the file outside the first sub file system by the application to the first sub file system.

9. The method according to claim 1, wherein a first sub file system is created on the first node and a storage device shared between the first node and the second node is mounted on the first sub file system, a second sub file system is created on the second node and the storage device is mounted on the second sub file system, and
   replicating the monitored updates to the file by the application from the active node to a storage device accessible to the passive node includes redirecting monitored updates to the file by the application to the first sub file system.

10. An apparatus for realizing high availability of an application installed on a first node and on a second node, the apparatus comprising:
   a redirecting module for determining whether the application is a high availability application based on an ID of the application;
   a monitoring module for monitoring access operations to files by the application during execution of the application on the first node;
   a replicating module for replicating, based on a determination that the application is a high availability application, the monitored updates to the file by the application from the first node to a storage device accessible to the second node based on the application updating the file during the access operations;

a sniffing module for sniffing the execution of the application on the first node; and a switching and initiating module for switching the first node to the second node and initiating the application on the second node in response to sniffing a failure in the execution of the application on the first node.

11. An apparatus according to claim 10, wherein, a first sub file system is created on the first node and a first dedicated block device is mounted on the first sub file system, and a second sub file system is created on the second node and a second dedicated block device is mounted on the second sub file system, the redirecting module redirects monitored updates to the file by the application to the first sub file system, and the replicating module replicates the updates in the first dedicated block device to the second dedicated block device.

12. The apparatus according to claim 11, wherein the replicating module is implemented by a disk operation hook that is hooked into the operating system, and the hook is initiated whenever an update to a file is written into the first dedicated block device.

13. The apparatus according to claim 11, wherein the redirecting module is responsive to the first monitored update to a file outside the first sub file system, to copy the file from outside the first sub file system into the first sub file system, and to create in the memory a file data structure of the file descriptor associated with the copy file in the first sub file system; and the redirecting module is configured to write monitored updates to the file outside the first sub file system by the application to the copy file within the first sub file system by using the file data structure.

14. The apparatus according to claim 11, wherein the redirecting module is configured to redirect the updates to the file by the application to the first sub file system.

15. The apparatus according to claim 10, further comprising an application initiator configured to register the ID of the application in a registry, wherein the redirecting module is configured to determine whether the application is a high availability application by determining whether the ID of the application is in the registry, in response to receiving a file access request from the application.

16. The apparatus according to claim 11, wherein the application is installed respectively on the first sub file system and the second sub file system, and the redirecting modules configured to redirect monitored access operations to a file outside the first sub file system by the application to the first sub file system.

17. The apparatus according to claim 10, wherein the switching and initiating module comprises:

a switching module and an initiating module.

18. The apparatus according to claim 10, wherein a first sub file system is created on the first node and a storage device shared between the first node and the second node is mounted on the first sub file system, a second sub file system is created on the second node and the storage device is mounted on the second sub file system.

19. The apparatus according to claim 10, wherein, the monitoring module and the redirecting module are implemented by a file operation hook that is hooked onto file access system calls of the operating system.

20. A non-transitory computer readable storage medium containing computer code that, when executed by a computer, implements a method for realizing high availability of an application installed on a first node and a second node, wherein the method comprises:

determining whether an application is a high availability application based on an ID of the application; and performing a file replication process based on a determination that the application is a high availability application, the file replication process comprising:

monitoring access operations to files by the application during execution of the application on the first node; and replicating a monitored update to a file by the application based on the application performing an update to the file during the access operations, such replication being from the first node to a storage device accessible by the second node;

sniffing execution of the application on the first node; and switching the application to and initiating the application on the second node in response to sniffing a failure in the execution of the application on the first node.

* * * * *